June 25, 1968 J. BARKER 3,389,443
FEEDING DEVICE FOR TUBULAR KNITTED FABRIC
Filed Jan. 21, 1966 6 Sheets-Sheet 1

Inventor
Joseph Barker
By his Attorney
Richard G. Wise

June 25, 1968 J. BARKER 3,389,443
FEEDING DEVICE FOR TUBULAR KNITTED FABRIC
Filed Jan. 21, 1966 6 Sheets-Sheet 6

3,389,443
FEEDING DEVICE FOR TUBULAR
KNITTED FABRIC
Joseph Barker, Leicester, England, assignor to United
Shoe Machinery Corporation, Boston, Mass., a corporation of New Jersey
Filed Jan. 21, 1966, Ser. No. 522,125
Claims priority, application Great Britain, Feb. 19, 1965, 7,165/65
3 Claims. (Cl. 26—55)

ABSTRACT OF THE DISCLOSURE

An apparatus for providing a uniform multi-ply lay of tubular fabric upon a work surface. A frame supports a plurality of sources of tubular fabric. A continuous piece of tubular fabric is fed from each of the sources through a stretching device where the several pieces are stretched to a uniform width and then led as a contiguous unit through a pair of feed rolls from which they emerge together and thence onto a work surface.

---

This invention relates to an apparatus adapted for use in automatically feeding tubular fabric material onto a work surface.

The invention embodies novel means whereby knitted tubular fabric is simultaneously fed from several sources, stretched to a uniform width and placed upon a work surface to form a multiple ply lay of coextensive layers.

As the art and mechanics of press cutting have advanced, this operation has become more popular for use of cutting fabrics in the clothing trade. To utilize press cutting efficiently it is desirable to cut lays of several plies of fabric simultaneously, thus conserving time and lessening wear on the press. However, the manual preparation of such lays is a time consuming operation. In particular, when preparing a lay of tubular knitted fabrics care must be taken to obtain a consistent width of the readily extensible fabric, and to align one ply of fabric accurately on top of another, assuring a product of consistent quality.

It is one of the various objects of the present invention to provide an apparatus which will automatically place a ply of tubular material of consistent width on a surface.

The present invention provides as one of its features an apparatus for feeding tubular material onto a work surface from a plurality of supplies, the apparatus comprising a main frame in which the supplies of material are supported, a stretching mechanism comprising a plurality of stretching devices one of which is associated with each of the supplies of material, and a feed mechanism mounted in the main frame below the stretching devices. Each of the stretching devices comprises a stretcher plate having parallel edge portions, support members, and guide members.

When the apparatus is in use each of the stretching devices is arranged to stretch the tubular material associated therewith to a constant width. The tubular material is fed over the stretcher plate so that the material surrounds the plate and extends beyond it in one direction to the source of supply and in the opposite direction to the surface receiving the lay. The stretcher plate, surrounded by the material, is supported by engagement with members which hold the plate against movement in the direction of movement of the material, and further by engagement with members which guide the parallel edge portions of the plate and hold the plate against movement transversely of the direction of movement of the material. The feed mechanism comprises rotatable feed rolls which when rotated draw the material from the plurality of supplies through the stretching mechanism and feed a lay of the material onto a work surface. The work surface of the illustrative mechanism is designed to be moved at a linear speed coincident with the speed of feed of the material assuring of a smooth, consistent lay.

The above and other features of the present invention including various novel details of construction and combination of parts will now be more particularly described with reference to the accompanying drawings and pointed out in the claims.

Figure 1:
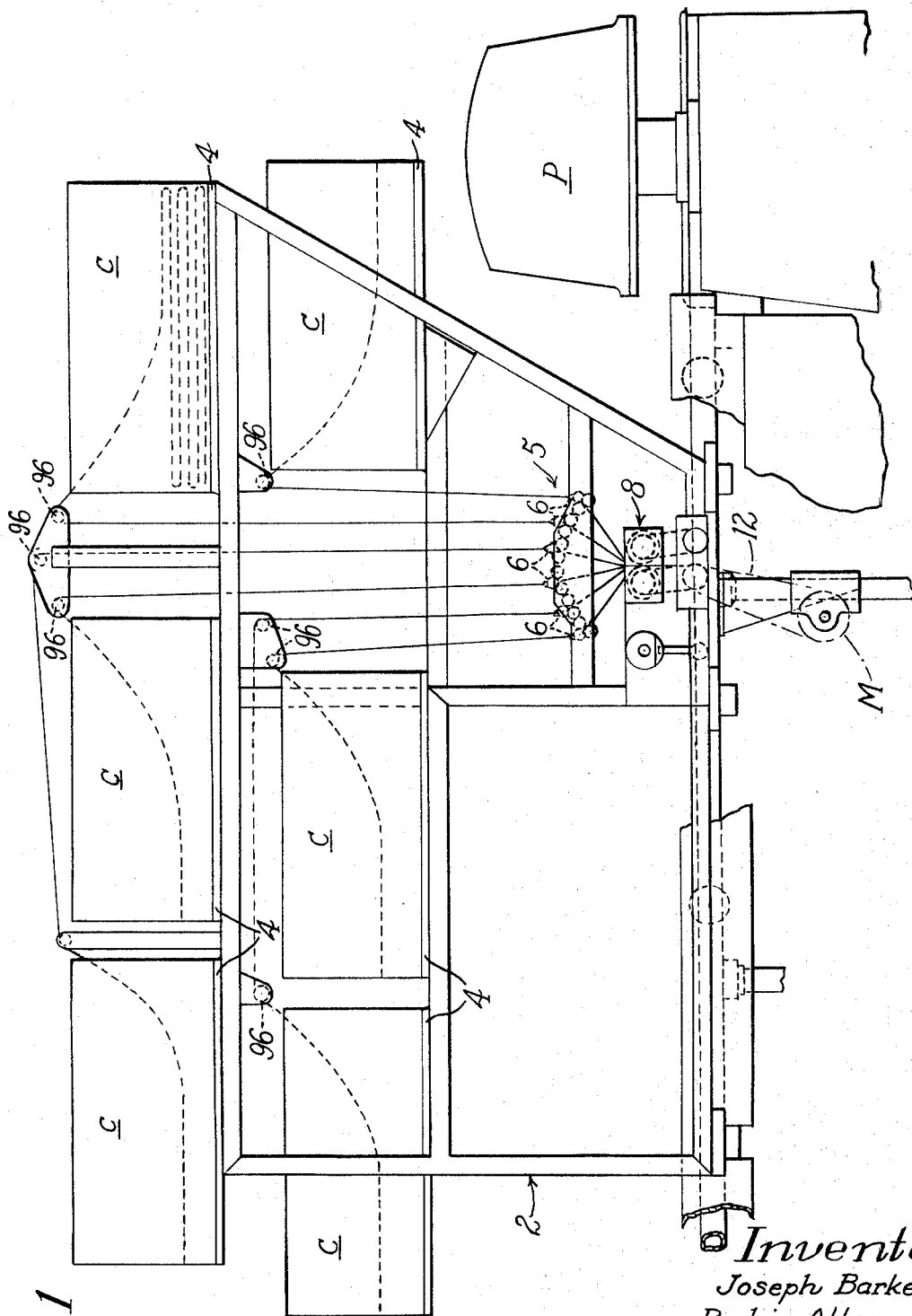
FIG. 1 is a side view of the illustrative apparatus.
Figure 6:
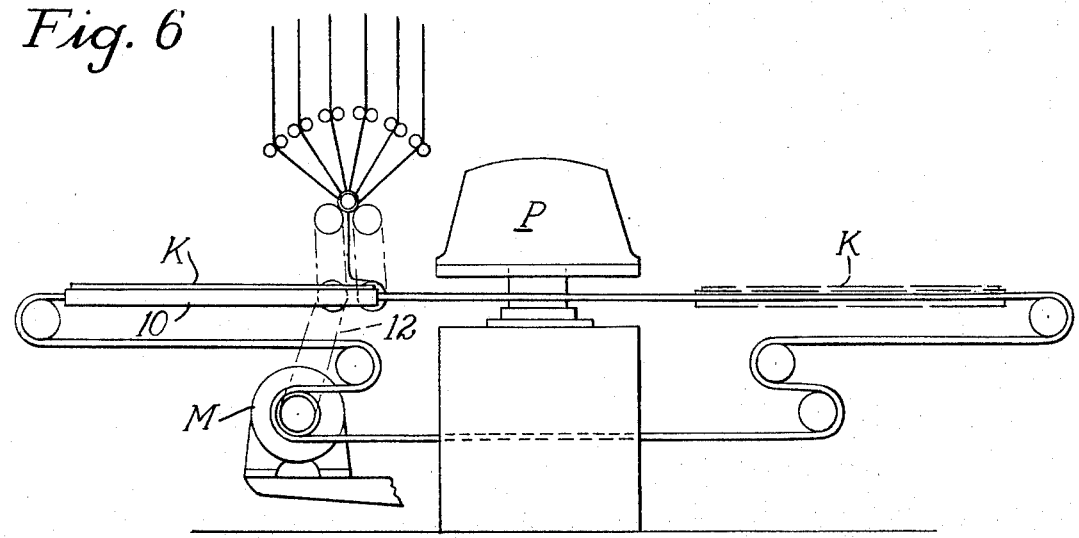
FIG. 6 is a side view of one possible arrangement of the feed mechanism, motor, table and the press.
Figure 7:
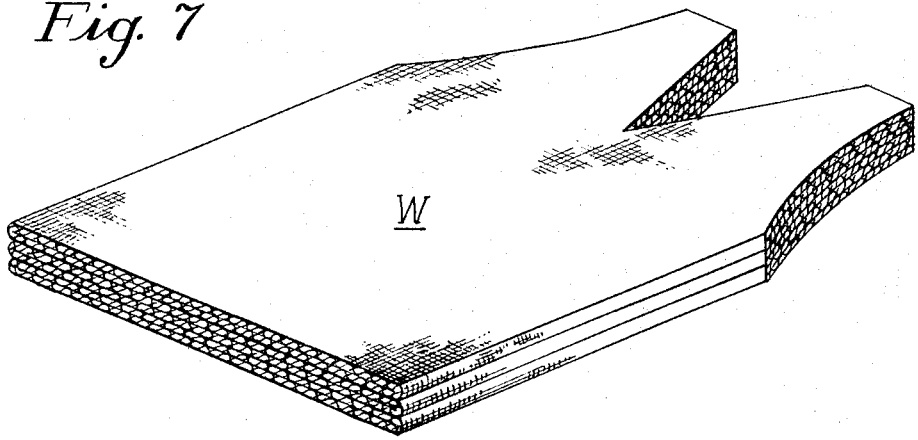
FIG. 7 is a perspective view of several plies of the tubular knit fabric following the cutting operation.

Referring to FIG. 1 wherein a general view of an illustrative apparatus is shown, a frame member 2 supports several platforms 4 (six being shown) upon each of which a supply of tubular knitted fabric is stored in an open-ended box or cuttle C ready for use. The fabric is simultaneously fed from the supplies to a stretching mechanism 5 comprising several stretching devices 6. After leaving the stretching mechanism 5, the several plies of material simultaneously pass through a feed mechanism 8 and are automatically laid upon a work surface 10 (FIG. 6). In the illustrative machine, the work surface is a movable table 10 which carries an upwardly facing knife K, the table 10 being movable into a press P where the cutting takes place and then beyond, as shown by dotted lines in FIG. 6, to a position where an operator can easily remove the stack of finished work W, see FIG. 7.

Figure 2:
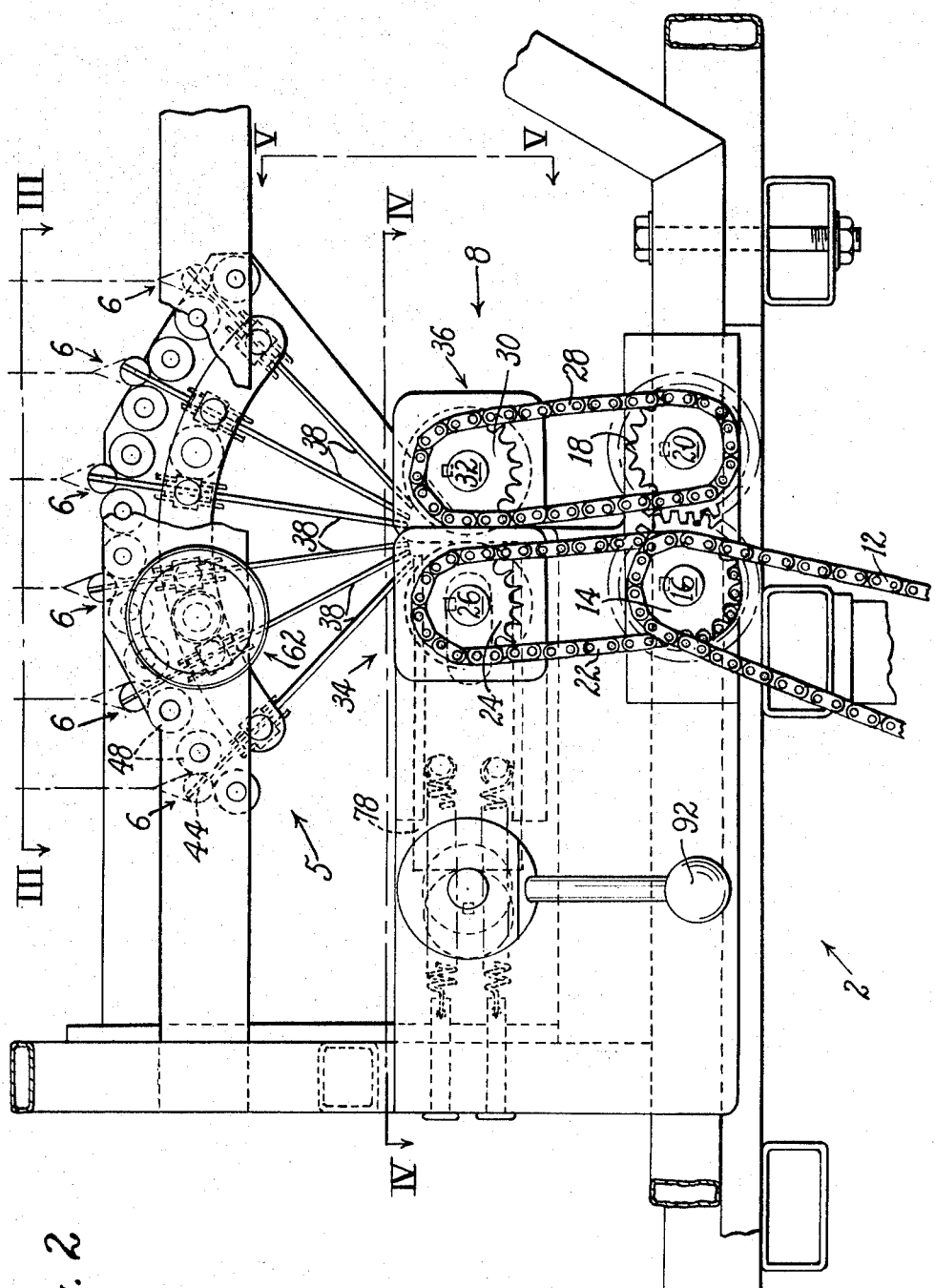
FIG. 2 is an enlarged view of the stretching and feeding mechanism.

Referring now particularly to FIG. 2, wherein an enlarged view of the stretching and feeding mechanism can be seen, a drive chain 12, receiving power from an external source generally designated as M, drives a sprocket wheel 14, mounted on a shaft 16, which in turn by means of a gear train drives another sprocket wheel 18, mounted on a shaft 20. Simultaneously by means of a chain 22 the sprocket wheel 14 drives a sprocket wheel 24, mounted on a shaft 26. The sprocket wheel 18, which is indirectly driven by the external source through the sprocket wheel 14, in turn drives a chain 28 which drives a sprocket wheel 30 mounted on a shaft 32. The sprocket wheel 30 rotates at the same rate of angular velocity as is imparted to sprocket wheel 24. The shafts 26 and 32 are directly connected to feed rolls 34 and 36, to be described later in detail.

Figure 3:
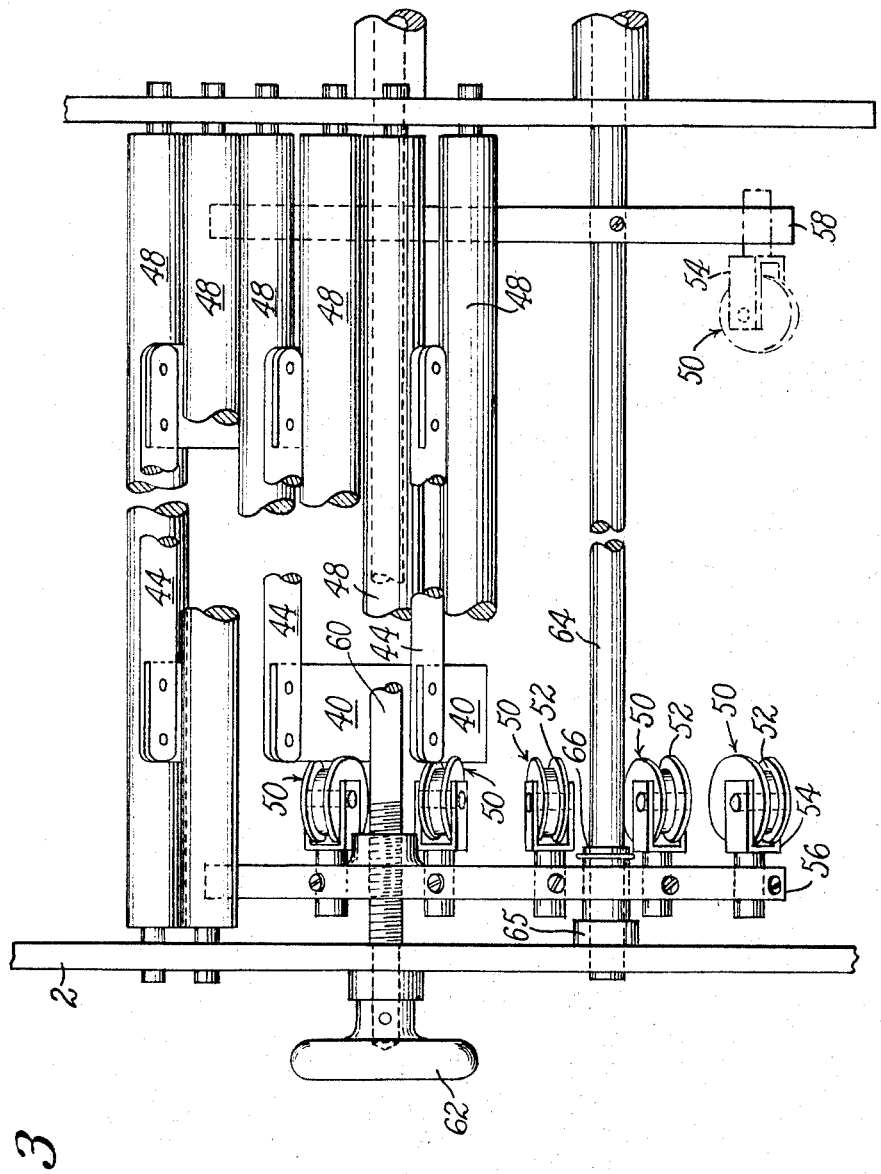
FIG. 3 is a plan view of the stretching and guiding mechanism.
Figure 5:
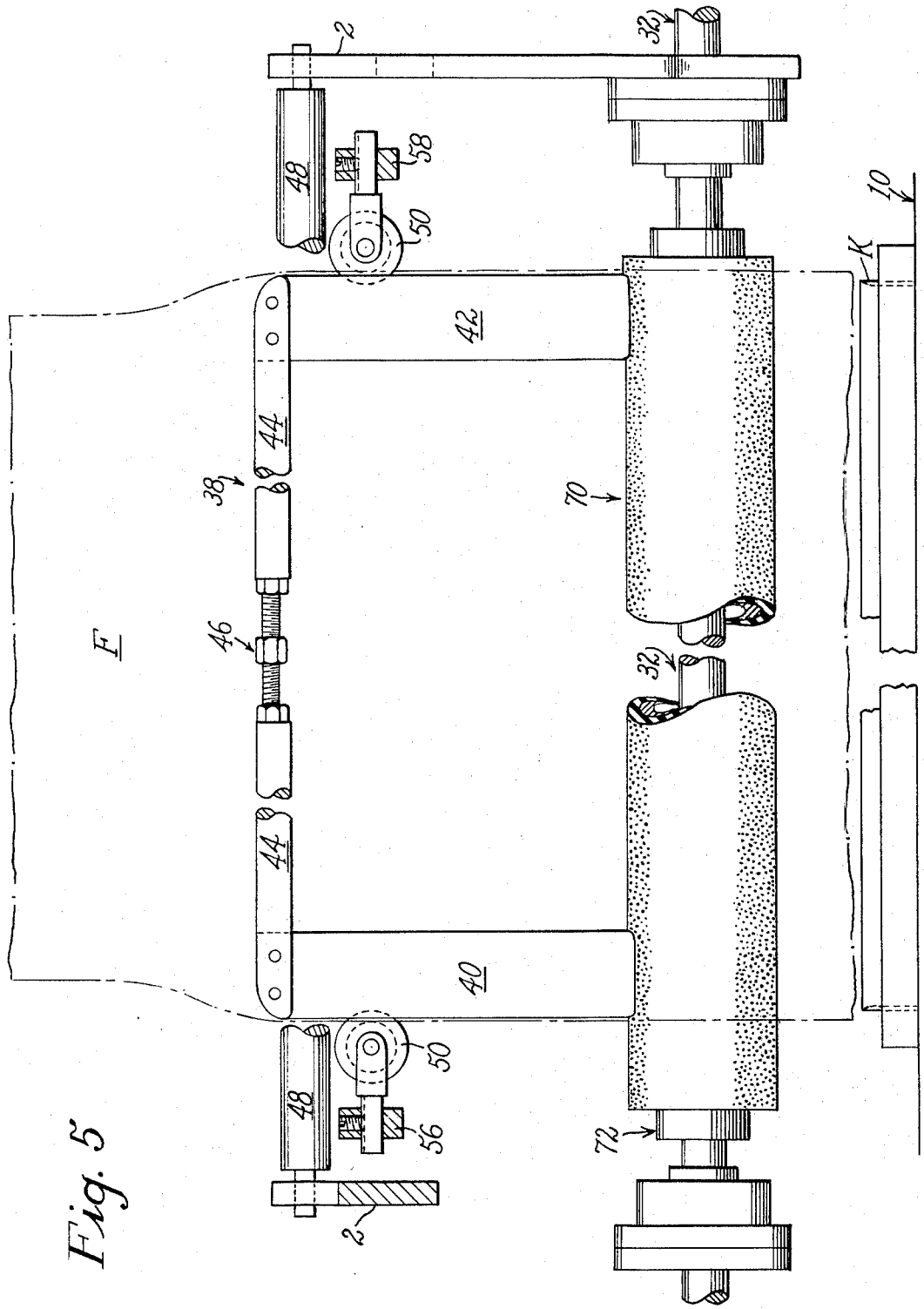
FIG. 5 is a view of some of the parts shown in direction of arrow V on FIG. 2.

As can further be seen in FIG. 2, the stretching mechanism 5 comprises several independent stretching devices 6 and associated stretching plates 38, one of which will now be more particularly described with reference to FIG. 5. Each stretching plate 38 comprises a U-shaped member having depending parallel legs 40 and 42 rigidly connected to opposite ends of an adjustable cross piece 44, enabling the plate 38 to be set at various widths, the adjustment being made possible by the lock nuts and a screw mechanism 46. As the tubular fabric F is drawn over and stretched by the stretching plate 38, the plate is urged by the fabric to move with said fabric and therefore means are provided to hold the plate in the desired position, such means comprising in part for each plate two highly polished rotatable tubular members 48, one mounted on each face of the stretch plate 38 parallel to the adjustable cross piece 44, best seen in FIG. 3. The tubular members are rotatably mounted in the frame 2 and located just below the cross piece 44 of the stretch plate 38 which rests upon the tubular members thus enabling fabric F to be drawn over the stretch plate 38 between the stretch plate face and the associated rotatable tubular members 48 while preventing undesired movement of the stretch plate in the direction of the feed of the fabric.

Further associated with each stretch plate 38 are two guide rolls 50 (see FIG. 3) each having exterior flanges 52, the guide rolls being positioned such that one of the flanges of each guide roll will lie on each of the opposite faces of one of the depending parallel legs 40, 42 preventing movement of the stretch plate in a direction transverse to the direction of fabric movement. The guide rolls 50 are each supported by a bifurcated member 54 rotatably mounted in one of two parallel plates 56, 58. The plates 56, 58 are mounted in the frame 2, one at each side of the several stretch plates 38, the guide plate 56 being adjustable by means of a threaded rotatable rod 60 passing through a threaded portion of the plate 56 and thence through a part of the frame 2 to terminate in a handle mechanism 62, the rod 60 being held in the frame against axial movement. The adjustment of the plate 56 is limited to motion axially along the threaded rod 60 and is guided by a fixed rod 64 mounted parallel to the threaded rod 60. The rod 64 includes at one end a collar 65 and a snap ring 66 spaced therefrom, the collar and snap ring being engageable with opposite faces of the plate 56 to limit its adjustment along rods 60, 64. Varying the distance between the two parallel plates 56, 58 enables an operator to easily position the fabric to be stretched around the stretch plate at the beginning of the operation.

Figure 4:
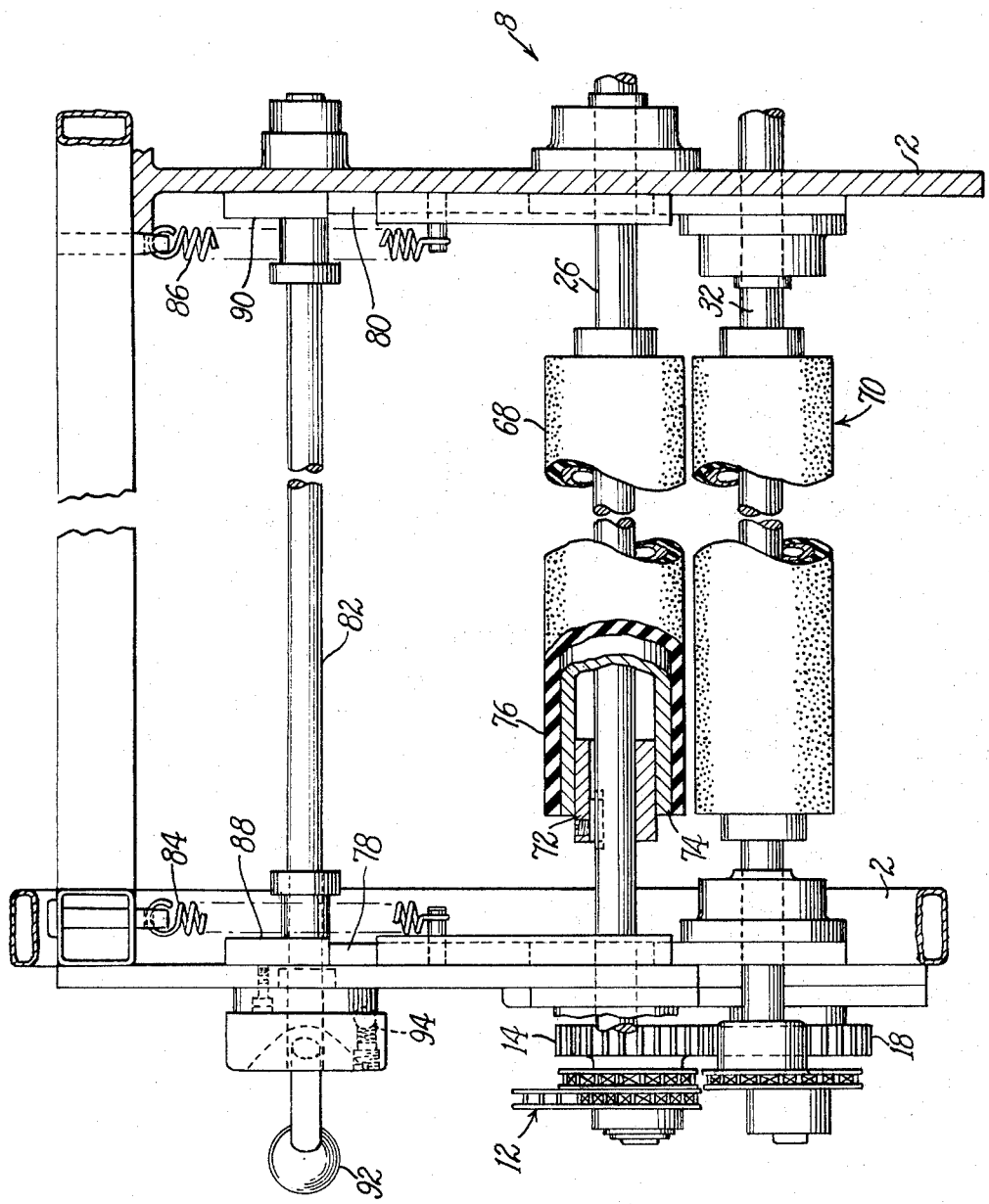
FIG. 4 is a section view along line IV—IV in FIG. 2.

The feed mechanism 8, as best seen in FIG. 4, comprises two feed rolls 68, 70 mounted on the shafts 26 and 32, respectively which are driven in opposite directions as heretofore described. The feed rolls are similar in construction and each comprises a key 72 securing an inner tubular roll member 74 to its drive shaft and an outer shell of rubber 76.

The shaft 32 carrying the feed roll 70 is rotatably mounted with a fixed axis in the frame 2 whereas the shaft 26 is mounted for rotation between two parallel slide blocks 78 and 80 slidably mounted in the frame 2. The position of the slide blocks 78 and 80, which move simultaneously, is controlled by means of a rotatable shaft 82 upon which is mounted two cam members 88, 90 as well as by springs 84 and 86. Each of the springs has one end attached to its respective slide block and the opposite end attached to the adjacent portion of the frame. Upon rotation of the shaft 82, the cam members adjust the position of the slide blocks and thus separation of the feed rolls, the slide blocks 78, 80 being held in contact with the cam members 88, 90, respectively, by the springs 84, 86. The shaft 82 is provided with a handle 92 to facilitate its rotation, certain oft used locations of the feed roll 68 being keyed by a spring-urged detent 94 mounted in the handle mechanism of shaft 82 and two or more recesses in the frame.

When the illustrative apparatus is in use a ply of material is drawn from each of the six or any desired lesser number of the cuttles C by the feed mechanism 8 over associated guide rolls 96, the several plies are substantially parallel to each other as they enter the stretching mechanism 5 where each of the plies passes through its associated stretching device 6 passing around the plate 38 which stretches the material of the ply and removes the creases. As the ply passes clear of the lower edge of the plate 38 a slight but generally uniform contraction of the material takes place, each of the plies undergoing the same relative shrinkage. Each ply passes from the stretching device 6 coextensive with the adjacent ply and then through the feeding mechanism 8 as a unit and onto the laying-up table 10, which is moving at a speed equal to the speed of the fed material enabling a smooth and consistent lay.

The stretching devices 6 are arranged above the feeding mechanism 8 and the plates 38 of the devices 6 converge towards each other ending just above the nip of the feed rolls 68 and 70, through which rolls the six plies pass. The six plies placed on the laying-up table 10 are coextensively aligned one with the other, and ready for the cutting operation.

The table 10 of the illustrative machine carries an upwardly facing knife K upon which the lay is placed and which when the table and its associated lay is moved into the press P and said press is activated cuts the material in the shape of the knife previous to which the multi-ply lay upon the work table is severed from the supply by any one of many available means, not a part of this invention and so not shown. The severing operation enables the table and its associated lay to move freely to a position beneath the press and after the cutting operation to further move freely to a position beyond said press (see dotted portion of FIG. 6) whereat an operator can easily remove the stack of cut plies W. It is obvious that the shape of the knife K is not critical and will be determined by the desired shape of the finished product. Following the removal of the work pieces W, the table 10 returns to the loading position, ready to begin another cycle. To conserve material, the leading edge of the severed multi-ply supply is used to begin another lay upon the table. The means used to replace the material upon the table in preparation for another cutting operation is not considered a part of this invention and so is not disclosed. To eliminate fouling of the material during the cutting operation, the feed of rolls 68, 70 is terminated by any appropriate means during the cutting operation.

It will be understood that the particular machine embodying the invention is shown by way of illustration only and not as a limitation of the invention. The principles and features of this invention may be employed in varied and numerous embodiments without departing from the scope of the invention.

Having thus described my invention, what I claim as new and desire to secure by Letters Patent of the United States is:

1. An apparatus for providing a multiply lay of tubular knitted fabric upon a work surface wherein each layer is from a separate source, comprising a rigid frame for supporting a plurality of sources of tubular knitted fabric in readiness for simultaneous feeding through stretching mechanism, a plurality of stretching mechanisms mounted on the frame adjacent each other, each to receive the fabric from a separate source, each of said mechanisms including independent suspended means to smooth and stretch the fabric from a source to a uniform width as said fabric is fed through said mechanism, the stretching mechanisms having smooth, unobstructed lower portions enabling convergence of several of the fabrics, and a pair of nip rolls mounted on the frame adjacent to but spaced from the exit of the stretching mechanisms for simultaneously moving the converging plurality of plies of tubular knitted fabric from the sources through the stretching mechanisms and while maintaining the several independent plies in contiguous registration with one another feeding the multi-ply lay upon a work surface.

2. An apparatus as in claim 1, wherein each suspended stretching mechanism comprises a pair of depending parallel legs which are independent of each other at their lowermost end and which are adjustable with respect to each other by means of an adjustable connecting cross piece at their uppermost end enabling the use of said plates for a variety of desired widths.

3. An apparatus as in claim 2, wherein said stretching mechanisms are each supported within the frame by a first pair of rollers, one rotatably mounted in the frame against each face of the stretch plate immediately below the adjustable cross piece of said stretching mechanism and a second pair of rollers mounted in the frame for each stretching mechanism, one associated with each of the depending legs to prevent lateral movement.

References Cited

UNITED STATES PATENTS

| | | | |
|---|---|---|---|
| 1,113,905 | 10/1914 | Pease | 26—55 |
| 2,308,061 | 1/1943 | Dodge et al. | 270—52 |
| 2,591,694 | 4/1952 | Gilbert | 270—52 |
| 3,119,168 | 1/1964 | Fleissner | 26—55 |
| 3,239,211 | 3/1966 | Gilbert | 270—52 XR |
| 3,250,164 | 5/1966 | Elsas. | |

FOREIGN PATENTS 884,254  12/1961  Great Britain.

ROBERT R. MACKEY, *Primary Examiner.*